(12) United States Patent
Saad (10) Patent No.: US 11,513,693 B2
(45) Date of Patent: Nov. 29, 2022

(54) SMART NETWORK INTERFACE CARD-BASED SPLITTER FOR DATA REPLICATION

(71) Applicant: EMC IP Holding Company LLC, Hopkinton, MA (US)

(72) Inventor: Yossef Saad, Ganei Tikva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 80 days.

(21) Appl. No.: 17/069,495

(22) Filed: Oct. 13, 2020

(65) Prior Publication Data

US 2022/0113878 A1 Apr. 14, 2022

(51) Int. Cl.
*G06F 3/06* (2006.01)
(52) U.S. Cl.
CPC ............ *G06F 3/0619* (2013.01); *G06F 3/065* (2013.01); *G06F 3/067* (2013.01); *G06F 3/0649* (2013.01); *G06F 3/0659* (2013.01)
(58) Field of Classification Search
CPC ...... G06F 3/0619; G06F 3/0649; G06F 3/065; G06F 3/0659; G06F 3/067
See application file for complete search history.

(56) References Cited

U.S. PATENT DOCUMENTS

| 8,335,771 | B1 * | 12/2012 | Natanzon | G06F 11/2069 |
| | | | | 707/684 |
| 2019/0294582 | A1 | 9/2019 | Zhu et al. | |
| 2020/0099721 | A1 | 3/2020 | Golan et al. | |
| 2020/0210355 | A1 | 7/2020 | Danilov et al. | |
| 2021/0271390 | A1 * | 9/2021 | Shemer | G06F 11/1448 |

OTHER PUBLICATIONS

European Search Report received for EP Patent Application No. 21198756.5, dated Mar. 10, 2022, 10 pages.

* cited by examiner

*Primary Examiner* — Hiep T Nguyen
(74) *Attorney, Agent, or Firm* — Workman Nydegger (57) ABSTRACT

One example method includes a splitter for data protection operations including replication operations. The splitter is located on or integrated into a smart network interface card and operates in two modes. The splitter is controlled by a replication controller. In one mode, the control path and the data path both go to the replication controller. In another mode, the data path is directly from the splitter to one or more targets without passing through the replication controller.

19 Claims, 6 Drawing Sheets

SMART NETWORK INTERFACE CARD-BASED SPLITTER FOR DATA REPLICATION

FIELD OF THE INVENTION

Embodiments of the present invention generally relate to data protection. More particularly, at least some embodiments of the invention relate to systems, hardware, software, computer-readable media, and methods for data protection operations including replication operations.

BACKGROUND

In the context of data protection, business continuity and disaster recovery solutions often rely on data replication. By replicating data from a source (e.g., a production site) to a target (e.g., replica site), a data protection system ensure that a complete and updated copy of the source exists at the target. If the source fails (e.g., data corruption) or experiences a disaster (e.g., power outage, natural disaster), the replicated data at the target is available for business continuity and disaster recovery purposes.

Replication operations typically involve write duplication or splitting writes such that the writes are sent to their intended destinations at the source and that copies of the writes are sent to the target. This helps ensure that the target copy of the data is synchronized or nearly synchronized with the source data.

A splitter operates by intercepting and forwarding writes to the target. Conventionally, a splitter is placed in a location that allows all writes to be intercepted. In one example, splitters are implemented at a host server, such as at the application layer or at the operating system layer. This implementation, however, requires installation and maintenance. After installation, the splitter must be maintained or updated regularly to account for application changes, operating system systems and versions, compatibility, life cycle management, and the like. This is tedious to implement.

In another example, a splitter may be implemented at a hypervisor layer in a virtual environment. This approach, however, is limited to virtualized environments and is not operable in non-virtualized environments. The revival of bare metal installations makes this solution less than optimal.

Implementing the splitter at the network switch level has been extremely difficult at least because of the need to have tight collaboration with other vendors and manufacturers. Integrating a splitter into network switches is extremely complicated and is subject to failure for various reasons, which include the fact that the splitter may not be aware of all the relevant storage devices when implemented at the network switch level and because the splitter becomes switch specific in nature. Similarly, implementing splitters at the storage devices also requires collaboration and integration with storage vendors. This makes a splitter storage specific and does not allow the splitter to be integrated into software-defined environments, where the storage does not necessarily have visibility into the data structures.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for data protection operations such as backup operations, recovery operations, replication operations, splitting operations, business continuity operations, disaster recovery operations, or the like or combination thereof.

Example embodiments of the invention further relate to data protection in the context of disaggregated server architectures. Embodiments of the invention further relate to incorporating aspects of data protection into devices such as smart network interface cards (smartNIC).

A smartNIC is a network interface card that includes additional processing and computing abilities. These capabilities allow processing to be offloaded from the main processing system to the smartNIC. A smartNIC, in accordance with embodiments of the invention, can perform communication and storage functions.

Data protection operations can be facilitated or implemented by integrating the data protection operations, including replication operations and splitting operations, into the smartNIC and more particularly into the storage functions of the smartNIC. Advantageously, the architecture of the data protection system allows some of the data protection processing performed, for example, by servers, to be offloaded to the smartNIC's processing capabilities. A splitting operation can be performed at the network card level. By implementing the splitter in the network card level, the data protection system, through a splitting operation, can operate in disaggregated and distributed environments.

Data protection components or modules, when implemented in a smartNIC can perform data protection operations and data manipulations such as encryption operations, deduplication operations, compression operations, and the like in addition to or in conjunction with splitting operations.

Figure 1:
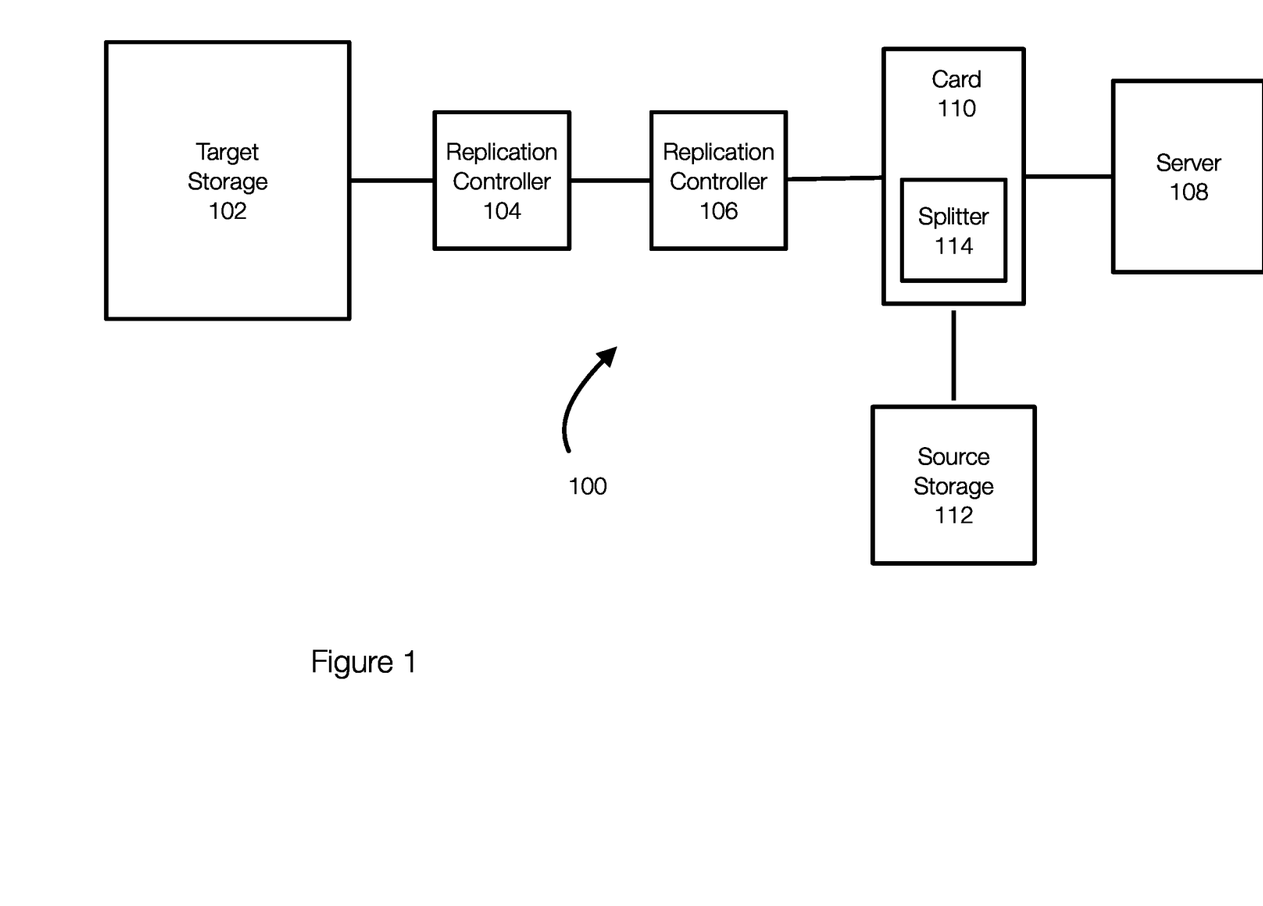
FIG. 1 discloses aspects of a computing environment including a data protection system configured to replicate data from a source to a target.

FIG. 1 illustrates an example of a computing environment in which a data protection system is implemented. FIG. 1 illustrates a system 100 in which data is replicated between a production site that includes at least a source server 108 and an associated source storage 112 to a target site that includes target storage 102. The data being replicated may include production data, virtual machines, applications, containers, and the like or combinations thereof. The source server 108 may be virtual, physical, bare metal, or the like or combination thereof.

In this example, the server 108 communicates with a replication controller 106 and the source storage 112 via a card 110, which is an example of a smartNIC. The replication controller 106 may be, by way of example only, a physical or virtual appliance or other server or machine (e.g., a DELL EMC RecoverPoint Appliance or vRPA). In this example, a splitter 114 is implemented in the card 110 and may be included, for example, in the network layer of the communication stack and may be integrated or associated with storage functionalities of the card 110.

More specifically, from a functional perspective, the splitter 114 may be placed in a block that handles storage functionality. This allows the splitter 114 to be aware of various storage entities represented by the storage 112 and used by the server 108, which may include LUNs, datastores, files, vmdks, software defined storage (SDN) and the like. The splitter 114 is aware of the storage 112 at least because the splitter may perform storage related operations with respect to the storage 112 and with respect to replication and because the splitter 114 is part of the storage data path.

The card 110 understands the relationship or stores relationships between the server 108 and the storage 112. As a result, placing the splitter 114 in the storage block of the card 110 ensures that the splitter 114 is also aware of these relationships and of the storage 112 itself.

Embodiments of the invention may be implemented in different manners or modes. In each mode, the replication controller and the splitter are each associated with a control plane or control path and a data path. In a first mode, both the control path and the data path touch the replication controller. In other words, the replication controller may serve as a data mover to pass data being replicated to the target site. In a second mode, the data path may not touch or pass through the replication controller. This allows the splitter to operate in a disaggregated and/or distributed environment because the splitter can direct the data to any destination and remove the replication controller from the data path. This allows the replication controller to control the replication without being a single point of failure or a bottleneck to the data being replicated and allows for scale-out implementation to accommodate a very high throughput of data.

For example, the server 108 shown in FIG. 1 may be representative of multiple servers or virtual machines that may each need to be replicated. Some of the servers or virtual machines may be in consistency groups or the like. By placing the splitter in the card 110, data associated with specific servers or virtual machines can be directed to specific targets.

Regardless of how the data is transferred, the target site or storage 102 may also be associated with a replication controller 104 that may be used for storing the replicated data, recovering the replicated data, failing over to the replicated data, or the like or combination thereof.

Figure 2A:
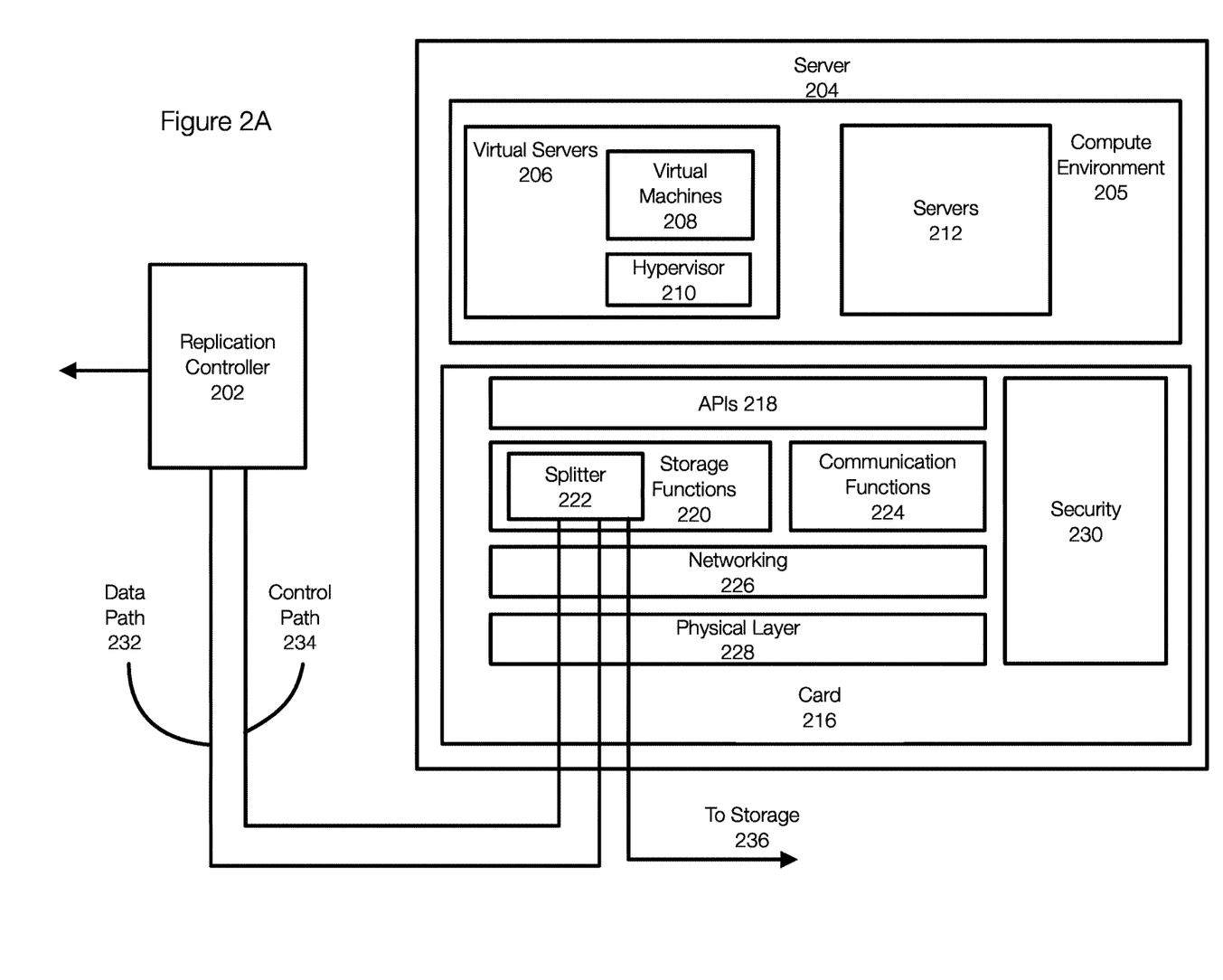
FIG. 2A illustrates an example of a data protection system including a splitter implemented in a smart network interface card and operating in a first mode.

FIG. 2A illustrates an example of data protection system including a splitter. FIG. 2A illustrates a first mode of operation where both the control path 234 and the data path 232 pass through the replication controller 202.

A server 204 may include two main blocks—the main compute environment 205 (e.g., an x86 CPU with its related memory and accessories) and the SmartNIC 246. The main compute 205 may be configured to include virtual servers 206 or physical servers 212. The virtual servers 206 may be implemented as or include virtual machines 208 that are instantiated on a hypervisor 210. The bare metal servers 212 may be a direct deployment of an operating system (OS) on the physical server's main compute environment 205. The servers 206 and the servers 212, in this example, communicate with a network and with other devices, servers, storage, computing machines, or the like via a card 246, which may be a smartNIC.

The card 216, by way of example only, may include layers such as a physical layer 228, a networking layer 226, storage functions 220, communication functions 224, security 230, and APIs (Application Programming Interface) 218. The layers, which may be layers of a communication stack or protocol, may be implemented as hardware and/or software. The card 216 may also include hardware, such as a processor and memory or a system on a chip, that allow the card 216 to perform and provide compute functionality For example, the storage functions 220 may be implemented or hard coded within an ASIC (Application Specific Integrated Circuit), as or within an FPGA (Field Programmable Gate Array), or the like or other processor. For FPGA based cards, the splitter 222 may be loaded into the FPGA of the card 216 together or separately from other code used in operating the card 216.

The replication controller 202 may be configured to discover the entities to be replicated. Thus, the replication controller 202 may discover the virtual servers 206 208 and the servers 212. The replication controller 202 may also determine a replication policy for each entity (e.g., each virtual machine or each server). This information may be stored by the replication controller 202 and/or on the card 216 for access by and use of the splitter 222.

Because writes from the virtual servers 206 and the servers 212 pass through the card 216, the splitter 222 can monitor each write operation because the splitter 222 is part of the storage functionality of the card 216. For each write operation, the splitter 222 may check to determine if the write operation is associated with a protected server. This may involve accessing the information related to the information describing the protected servers. If the write operation is associated with a protected entity or server, the splitter 222 will duplicate the write by sending the write to the storage 234 and by sending the write to the replication controller 202. The replication controller 202 is configured to send the write to a remote target through, in one example, another replication controller.

The splitter 222 may also perform other manipulations such as deduplication and compression to improve the efficiency of the data transport. This could also be performed by the replication controller 202.

In the mode of operation shown in FIG. 2A, the replication controller 202 and the splitter 222 are both associated with a data path 232 and a control path 234. As a result, the replication controller 202 is configured to control the operation of the splitter 222 and also function as a data mover. In other words, the writes or data being replicated by the splitter 222 flow through the replication controller 202 in FIG. 2A because the replication controller 202 is part of the data path.

Figure 2B:
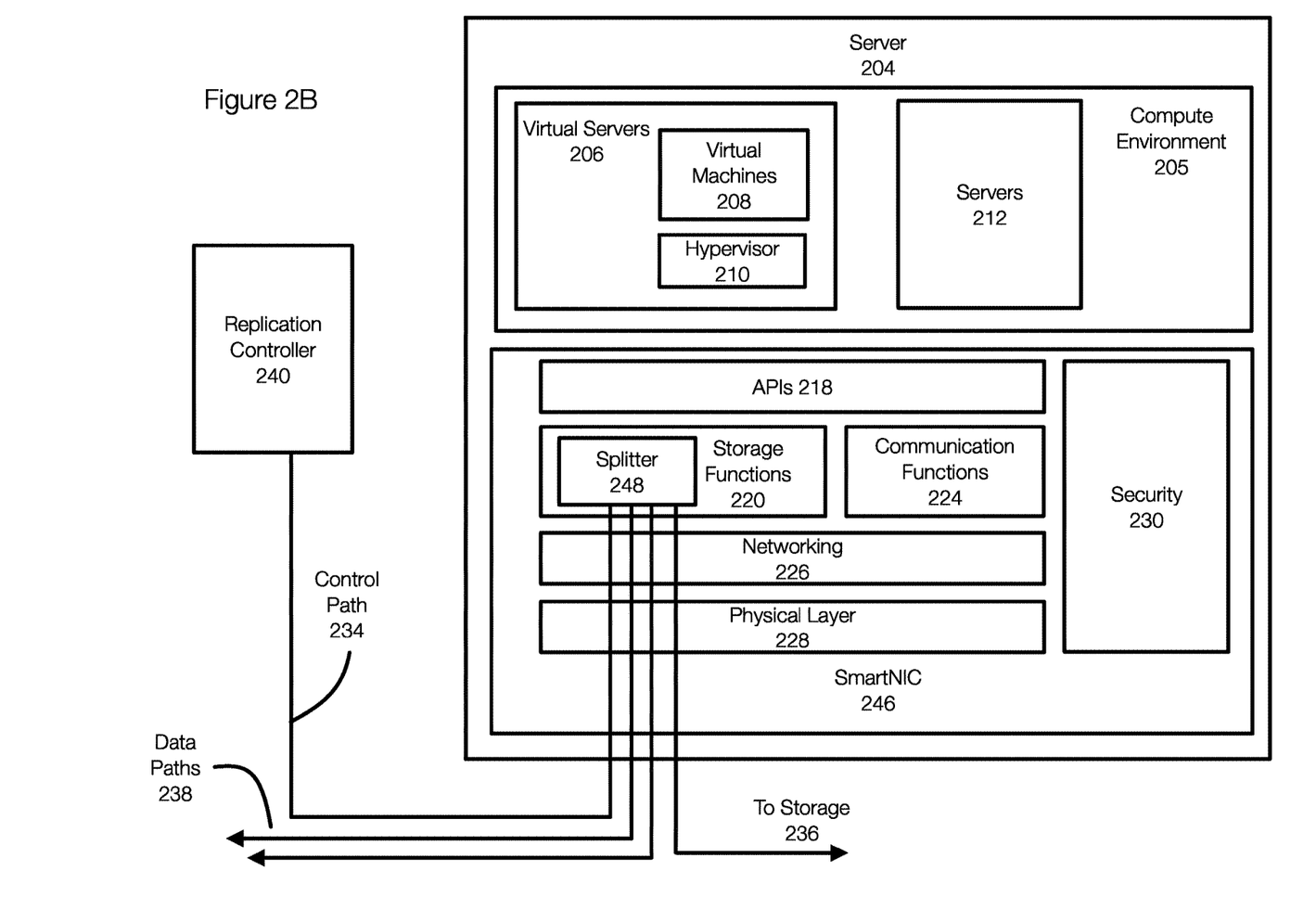
FIG. 2B illustrates another example of a data protection system including a splitter implemented in a smart network interface card and operating in a second mode.

FIG. 2B illustrates another example of a data protection system including a splitter. FIG. 2B illustrates a card 246, which is similar to the card 216 and has substantially the same components or blocks. However, the card 246 is configured to operate in a second mode that is distinct from the first mode of operation shown in FIG. 2A.

FIG. 2B differs at least in part because the replication controller 240 (which is similar to the replication controller 202) does not function as a data mover and may not be part of the data path 238, which data path 238 is different from the data path 232 shown in FIG. 2A. In addition, the splitter 248, which is similar to the splitter 222, is configured to operate with different data paths 238.

The replication controller 240 may also control the data distribution between the various source servers and the target replica storage. In case there are multiple servers with increased aggregated data throughput and/or different data protection policies, or even a single server with very high throughput, the replication controller 240 may determine to send different parts of the data to different target storage systems. In such a case the data streams coming from the servers may be split and sent to multiple storage targets, $T_i$, i=1 . . . N, directly from the SmartNIC. The data paths 238 represent multiple data paths and illustrate that data may be sent via separate paths from the splitter 248 to separate targets. More specifically, the replication controller determines for each source server per entity or server 204, the appropriate target server at the remote site. When operating in the second mode, which allows for disaggregated networking and scale out implementation.

The card 246 has the resources to perform all required transport functions that allow the splitter 248, under control of the replication controller 240, to send data to different targets. Further, the card 246 may also provide QoS and bandwidth throttling per host/replicated-entity.

As the splitter 248 monitors each write from the servers 206 and/or servers 212, each write can be sent to the storage 236 (which may include multiple storage systems) and to various target servers, depending on the source of the write. When operating in this mode and if a journal is implemented, the journal may be implemented at each target rather than a central location.

Advantageously, the splitter 222 is in an optimal location. The splitter 248, when located in the card 246 or more specifically in the storage functions 220, is aware of the storage entities in the storage 236 and can distinguish between LUNs, datastores, virtual disks, and the like. Advantageously, the functionality or splitting operation is offloaded from the processing capabilities of the servers 206/216 to the card 246 and do not impact the performance of the servers 206 and/or 212.

When operating in the mode shown in FIG. 2B, the splitter 248 or the replication controller 240 can implement point-to-point or mesh transmission in a manner that is centrally controlled and managed by the replication controller 240. Bottlenecks through the replication controller 240 can be eliminated because the data or the transport of data does not pass through the replication controller 240. As a result, the replication controller 240 is not a single point of failure and embodiments of the invention thus contribute to resilient operation.

Figure 3A:
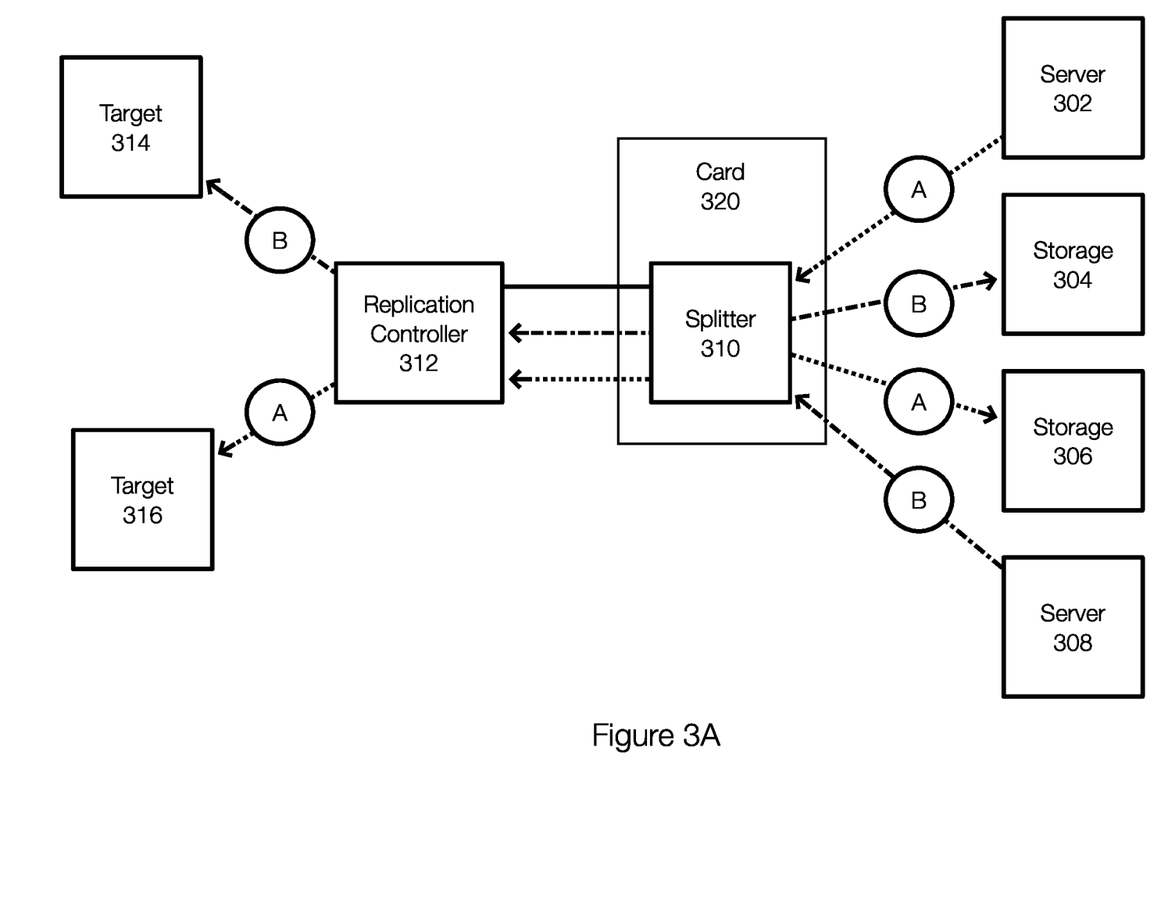
FIG. 3A illustrates an example of a method for replicating data at a card operating in a first mode.

FIG. 3A illustrates examples of a splitting operation performed at a card that is operating in a first mode. FIG. 3A illustrates a card 320 that is configured with a splitter 310. The card 320 is associated with a source or server 302 and a source or server 308, which may be virtual servers or other types of servers, machines, or devices. The splitter 310 is also aware of the storages 304 and 306, which may be of different types.

Initially, the replication controller 312 may discover the servers 302 and 308. The replication controller 312 may query the network or be informed of the servers 302 and 304. The replication controller 312 may also determine a replication policy for each of the servers 302 and 308. The card 320 and thus the splitter 310 is aware of the storage 304 and 306 as well as their type and is able to use the storage functionality and transport functionality of the card 320 to ensure that writes are properly delivered to the storages 304 and 306.

In this example, the server 302 may issue or perform a write A. The write A is intercepted by the splitter 310, because the splitter 310 is part of the storage functionality of the card 320. The splitter 310 may determine the source of the write A and replicate the write A in accordance with the associated policy. In this example, the splitter 310 sends the write A to the storage 306 and sends the write or a copy thereof to the replication controller 312. The replication controller 312 then transmits the write A to the target 213.

The write B is handled in a similar manner and in accordance with its associated policy. The write B is received or intercepted by the splitter 310. The splitter 310 sends the write B to the storage 304 and then forwards or transports the write B to the target 314.

In one example in this mode of operation, the targets 314 and 316 may the same target. The targets 314 and 316 could be at the same location or at different locations. FIG. 3A illustrates that the data replicated at the splitter 310 flows through the replication controller 312 (the dashed data path) and that the control path is also from the replication controller 312 (solid line).

Figure 3B:
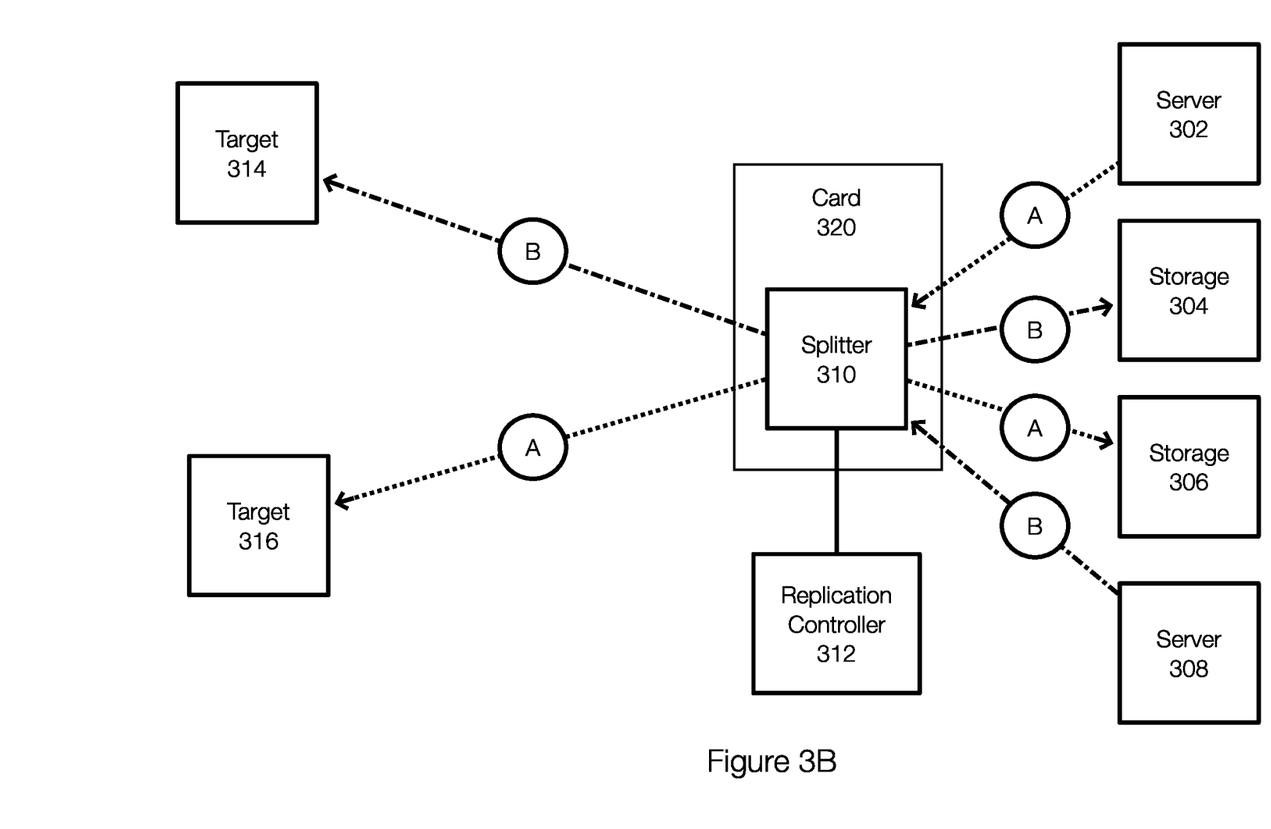
FIG. 3B illustrates an example of a method for replicating data at a card operating in a second mode.

FIG. 3B illustrates another mode of operation. In this example, the data paths do not flow through the replication controller 312. Rather the splitter 310, when replicating the write A, sends the write A direction to the target 316. Similarly, the splitter 310 sends the write B directly to the target 314.

Figure 4:
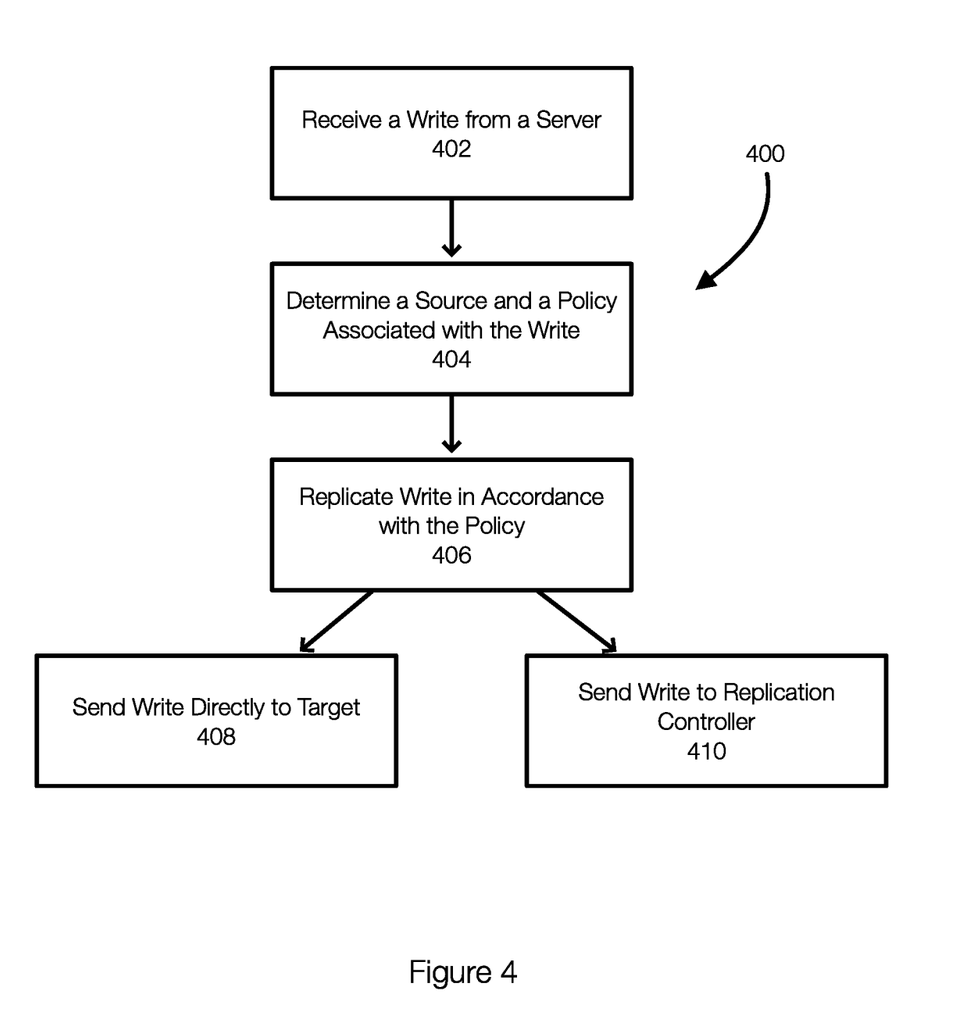
FIG. 4 illustrates an example method for replicating data.

FIG. 4 illustrates an example of a method for replicating a write. In the method 400, in operation, a splitter may receive 402 a write from a server. Because the splitter is located or instantiated in a card such as a smartNIC, the splitter is aware of the potential on-premise or production storages and the transport capability of the card. After the write is received, the source of the write and the associated policy is determined 404. Because the card may provide network transport and other network operations for multiple servers, identifying the source and the policy enables the splitter to determine the target for the copy of the write as well as the intended destination of the write.

The splitter may then replicate 406 the write accordingly by sending the write to the intended destination (or allowing the write to complete normally), and transporting the write in accordance with the source and policy information. In one mode, the data is replicated or sent 408 directly to a target under control of a replication controller. In another mode, the data or write is replicated or sent 410 to the replication controller and the replication controller is configured to send or transport the write to the target.

The card is typically optimized for network operations and is thus optimal for distributing the writes in either mode of operation. Further, the transport and networking of the splitting operation can be performed without using the computing resources of the servers that originated the writes. Further, locating the splitter in the card allows the splitter to be aware of all storage entities and to distinguish between them.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, data read/write/delete operations, transport operations, replication operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing replication platforms such as Dell EMC's RecoverPoint and RecoverPoint for VMs, and in backup platforms, examples of which include the Dell-EMC NetWorker and Avamar platforms and associated backup software, and storage environments such as the Dell-EMC DataDomain storage environment. In general however, the scope of the invention is not limited to any particular data replication, backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: receiving a write a splitter, wherein the splitter is on a network card and is integrated with storage functions of the network card and wherein the splitter is controlled by a replication controller via a control path;

determining a source of the write and a policy associated with the source, replicating the write in accordance with the policy, and transporting the write to a target based on a mode of the splitter and transmitting the write to a storage associated with the source.

Embodiment 2. The method of embodiment 1, further comprising transporting the write to the target through the replication controller when operating in a first mode and transporting the write directly to the target when operating in a second mode.

Embodiment 3. The method of embodiment 1 and/or 2, wherein the second mode is associated with disaggregated targets such that a data path of writes replicated by the splitter do not pass through the replication controller.

Embodiment 4. The method of embodiment 1, 2, and/or 3, further comprising hard coding the splitter into an ASIC.

Embodiment 5. The method of embodiment 1, 2, 3, and/or 4, further comprising programming the splitter into an FPGA.

Embodiment 6. The method of embodiment 1, 2, 3, 4, and/or 5, wherein the second mode is associated with a plurality of targets, the method further comprising journaling at each of the plurality of targets.

Embodiment 7. The method of embodiment 1, 2, 3, 4, 5, and/or 6, further comprising controlling the splitter, by the replication controller, over the control path, wherein controlling splitter includes one or more of turning functionality on/off for specific storage targets, associating specific storage target low-level (network) addresses with high-level storage volumes identifiers, specifying network target addresses for specific data streams, managing the life-cycle and updates of the splitter, managing operation of the splitter at least when a virtual server is migrated to a different physical host and the splitter needs to flush the existing data and transfer responsibility to another splitter on another physical host.

Embodiment 8. The method as recited in any of embodiments 1 to 7 or any of the elements thereof.

Embodiment 9. A method for performing any of the operations, methods, or processes, or any portion of any of these, disclosed herein.

Embodiment 10. A smart network interface card configured to provide network functions to a source and to storage, the card comprising: a transport block comprising a processor, an ASIC, or an FPGA, the transport block configured to perform network transport functions for the source, the source including servers, a storage block comprising the processor, an ASIC, or an FPGA, the storage block configured to perform storage functions, wherein the storage block is aware of the storage and types of the storage, a splitter integrated into the storage block and controlled by a replication controller via a control path, wherein the splitter is configured to replicate writes from the source to at least one target by: receiving the writes from the servers, identifying, for each of the writes, an associated one of the servers and a policy associated with that server, replicating the write in accordance with the policy to a particular target, and transporting the write to the target based on a mode of the splitter and transmitting the write to the storage associated with the server.

Embodiment 11. The card of embodiment 10, wherein the mode is one of a first mode and a second mode, wherein a data path for the first mode includes the replication controller and wherein a data path for the second mode does not include the replication controller.

Embodiment 12. The card of embodiment 10 and/or 11, wherein the second mode is associated with disaggregated targets such that the data path associated with the second mode is directly from the splitter to at least one of the disaggregated targets.

Embodiment 13. The card of embodiment 10, 11, and/or 12, wherein the splitter is hard coded into the ASIC or programmed into the FPGA.

Embodiment 14. The card of embodiment 10, 11, 12, and/or 13, further comprising controlling the splitter, by the replication controller, over the control path.

Embodiment 15. A non-transitory storage medium having stored therein instructions that are executable by one or more hardware processors to perform operations comprising the operations of any one or more of embodiments 1 through 9.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the disclosure and/or the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

The physical computing device may include a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a write at a splitter, wherein the splitter is on a network card and is integrated with storage functions of the network card and wherein the splitter is controlled by a replication controller via a control path;
   determining a source of the write and a policy associated with the source;
   replicating the write in accordance with the policy; and
   transporting the write to a target based on a mode of the splitter and transmitting the write to a storage associated with the source.

2. The method of claim 1, further comprising transporting the write to the target through the replication controller when operating in a first mode and transporting the write directly to the target when operating in a second mode.

3. The method of claim 2, wherein the second mode is associated with disaggregated targets such that a data path of writes replicated by the splitter do not pass through the replication controller.

4. The method of claim 1, further comprising hard coding the splitter into an ASIC.

5. The method of claim 1, further comprising programming the splitter into an FPGA.

6. The method of claim 2, wherein the second mode is associated with a plurality of targets, the method further comprising journaling at each of the plurality of targets.

7. The method of claim 1, further comprising controlling the splitter, by the replication controller, over the control path, wherein controlling splitter includes one or more of turning functionality on/off for specific storage targets, associating specific storage target low-level (network) addresses with high-level storage volumes identifiers, specifying network target addresses for specific data streams, managing the life-cycle and updates of the splitter, managing operation of the splitter at least when a virtual server is migrated to a different physical host and the splitter needs to flush the existing data and transfer responsibility to another splitter on another physical host.

8. A non-transitory storage medium having stored therein instructions that are executable by one or more hardware processors to perform operations comprising:
   receiving a write at a splitter, wherein the splitter is on a network card and is integrated with storage functions of the network card and wherein the splitter is controlled by a replication controller via a control path;
   determining a source of the write and a policy associated with the source;
   replicating the write in accordance with the policy; and
   transporting the write to a target based on a mode of the splitter and transmitting the write to a storage associated with the source.

9. The non-transitory storage medium of claim 8, further comprising transporting the write to the target through the replication controller when operating in a first mode and transporting the write directly to the target when operating in a second mode.

10. The non-transitory storage medium of claim 9, wherein the second mode is associated with disaggregated targets such that a data path of writes replicated by the splitter do not pass through the replication controller.

11. The non-transitory storage medium of claim 8, further comprising hard coding the splitter into an ASIC.

12. The non-transitory storage medium of claim 8, further comprising programming the splitter into an FPGA.

13. The non-transitory storage medium of claim 9, wherein the second mode is associated with a plurality of targets, the method further comprising journaling at each of the plurality of targets.

14. The non-transitory storage medium of claim 8, further comprising controlling the splitter, by the replication controller, over the control path wherein controlling splitter includes one or more of turning functionality on/off for specific storage targets, associating specific storage target low-level (network) addresses with high-level storage volumes identifiers, specifying network target addresses for specific data streams, managing the life-cycle and updates of the splitter, managing operation of the splitter at least when a virtual server is migrated to a different physical host and the splitter needs to flush the existing data and transfer responsibility to another splitter on another physical host.

15. A smart network interface card configured to provide network functions to a source and to storage, the card comprising:
 a transport block comprising a processor, an ASIC, or an FPGA, the transport block configured to perform network transport functions for the source, the source including servers;
 a storage block comprising the processor, an ASIC, or an FPGA, the storage block configured to perform storage functions, wherein the storage block is aware of the storage and types of the storage;
 a splitter integrated into the storage block and controlled by a replication controller via a control path, wherein the splitter is configured to replicate writes from the source to at least one target by:
 receiving the writes from the servers;
 identifying, for each of the writes, an associated one of the servers and a policy associated with that server;
 replicating the write in accordance with the policy to a particular target; and
 transporting the write to the target based on a mode of the splitter and transmitting the write to the storage associated with the server.

16. The card according to claim 15, wherein the mode is one of a first mode and a second mode, wherein a data path for the first mode includes the replication controller and wherein a data path for the second mode does not include the replication controller.

17. The card according to claim 16, wherein the second mode is associated with disaggregated targets such that the data path associated with the second mode is directly from the splitter to at least one of the disaggregated targets.

18. The card according to claim 16, wherein the splitter is hard coded into the ASIC or programmed into the FPGA.

19. The card according to claim 15, further comprising controlling the splitter, by the replication controller, over the control path.

* * * * *